March 12, 1968  A. E. LARSEN ET AL  3,372,893
AIR TO GROUND DESCENT MEANS
Filed Sept. 7, 1965  2 Sheets-Sheet 1
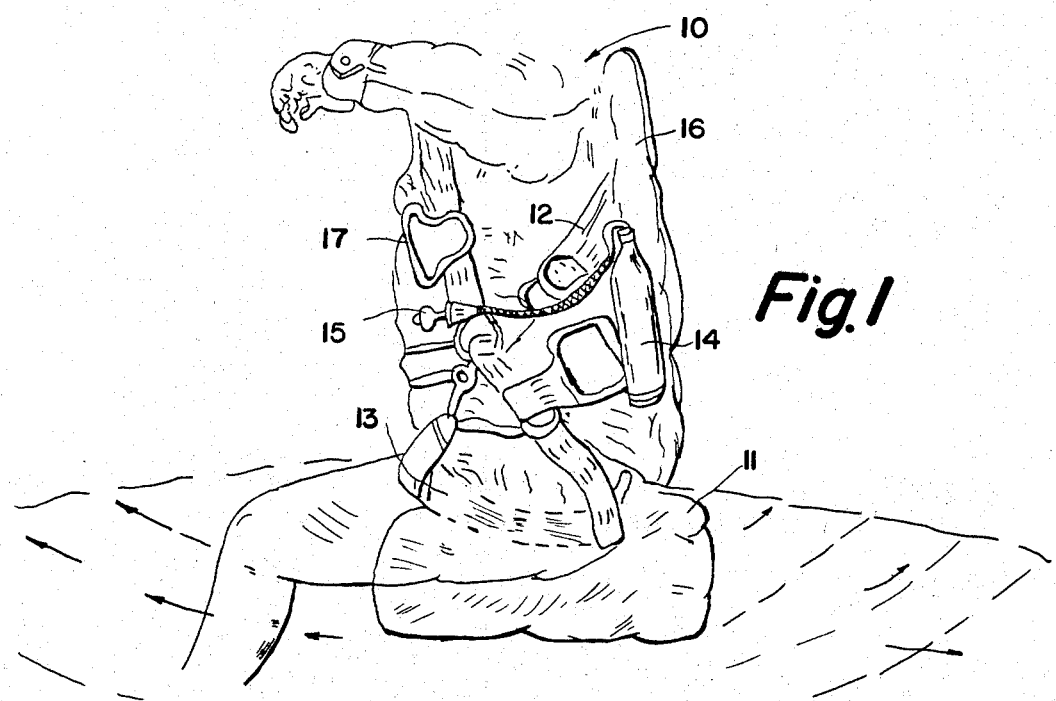
Fig. 1
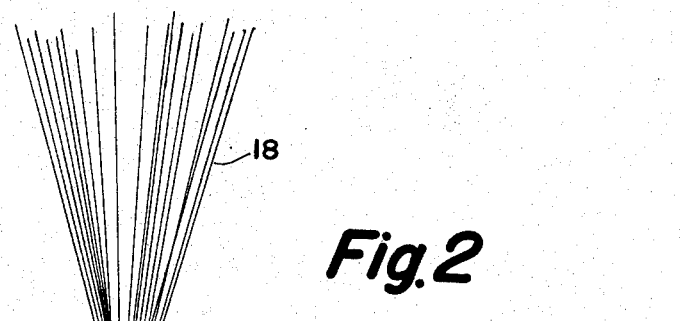
Fig. 2
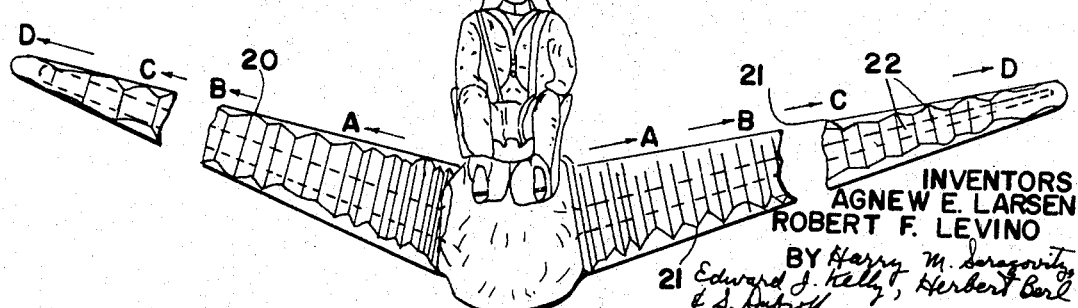
INVENTORS
AGNEW E. LARSEN
ROBERT F. LEVINO
ATTORNEYS March 12, 1968  A. E. LARSEN ETAL  3,372,893
AIR TO GROUND DESCENT MEANS Filed Sept. 7, 1965

INVENTORS
AGNEW E. LARSEN
ROBERT F. LEVINO
BY Harry M. Saragovitz
Edward J. Kelly, Herbert Berl
& S. Dubroff
ATTORNEYS ര
United States Patent Office 3,372,893
Patented Mar. 12, 1968

3,372,893
AIR TO GROUND DESCENT MEANS
Agnew E. Larsen, New Britain, and Robert F. Le Vino, Huntingdon Valley, Pa., assignors to the United States of America as represented by the Secretary of the Army
Filed Sept. 7, 1965, Ser. No. 485,654
4 Claims. (Cl. 244—138)

ABSTRACT OF THE DISCLOSURE

A combination of a parachute attached to, and working in connection with, an inflatable aircraft having an inflation means attached thereto.

---

The invention described herein may be manufactured and used by or for the Government for governmental purposes without the payment to us of any royalty thereon.

The present invention relates to an air to ground descent means and more particularly to an air to ground descent means utilizing a parachute and inflatable including an inflatable fixed wing aircraft.

A parachute airborne, emergency air escapee is subject to all of the inherent limitations imposed upon him by the relative lack of controlled descent of present service types of parachutes. These limitations of maneuverability also restrict and determine the scope of airborne logistics of parachute operations. Accordingly it is the object of this invention to remove these restrictive limitations of airborne escape, and paratrooper operations by the addition of controlled mobility in descent through the medium of replacing and discarding the conventional parachute by mid-air transition into an inflated aircraft.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 shows the invention in its folded condition as worn by the pilot.

FIG. 2 shows the inflatable aircraft in the process of becoming inflated.

Figure 3:
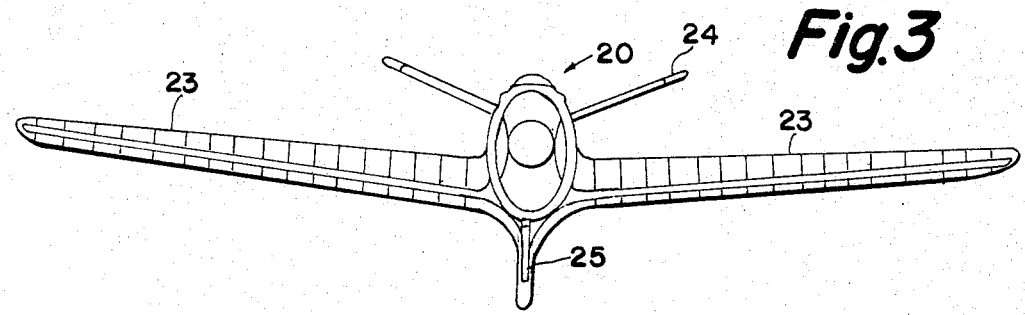
FIG. 3 shows the front view of a fully inflated aircraft of the type shown in FIG. 2.

Referring now to the drawings, wherein like reference characters designate like or corresponding parts throughout the several views, there is shown in FIG. 1 a pilot 10 wearing the usual back parachute 16. A folded uninflated aircraft 11 is located between the ejection seat 19 and a saddle seat 13. Said folded aircraft 11 and said saddle seat 13 are secured to the pilot 10 by usual parachute harness straps 12. Also secured to the harness straps 12 is a gas pressure generator 14 which may be of the type containing any convenient gas preferably of a nonflammable type such as carbon dioxide, nitrogen, or air when necessary, or of the propellant actuated device type, controlled in a known manner by a control knob 15. After ejection from the disabled aircraft, by the use of any known catapult device, the escapee will activate his back parachute 16 by use of a rip cord handle 17 thereby releasing said parachute to the open condition. After the parachute opens, the escapee then activates the inflating means 14 by way of control 15 thereby inflating the aircraft 20 which includes an inflatable fixed wing. The arrows, as shown in FIG. 1, illustrate the direction of elastic release at the time of opening. As shown in FIG. 2, the aircraft 20 will rapidly inflate due to the bellows or accordion construction 21. The aircraft inflates in progressive steps illustrated by reference characters A, B, C and D with an inner high pressure tube 22 utilized therein to expedite extension. After the inflation has started the escapee will release his ejection seat, in a known manner, and after complete inflation occurs, will release parachute 18, in a known manner, thereby effecting the transition from the parachute to the inflated aircraft. A standard parachute release provides a delay, after initiation, to prevent inadvertent release of the parachute immediately after opening, this detaches the parachute when the load becomes zero, as it would when the inflated aircraft becomes fully airborne. The release of the parachute can also be operated manually. The inflated aircraft has wings 23, tail assembly 24, and a landing skid 25.

Figure 4:
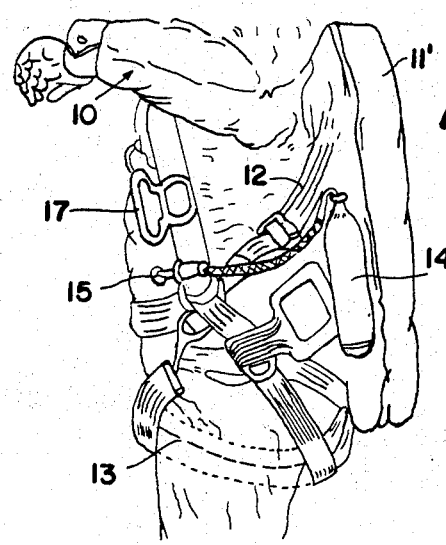
FIG. 4 illustrates a second embodiment of the invention in its folded condition as worn by a crew member.

The embodiment of FIG. 4 is similar to the embodiment of FIG. 1 except that the inflatable aircraft $11^1$ is carried on the back of the crew member who is not the pilot and who will jump from a disabled aircraft rather then being ejected therefrom. A breast located parachute, not shown, would be utilized in this embodiment, rather than the back parachute 16 of the embodiment of FIG. 1, because of the lack of room on the wearer.

The simple design, of the aircraft of FIG. 1, would be completely devoid of power and mechanical control, but would afford means and capabilities of manual manipulation, by movement of body mass about three axes. Longitudinal pitch about the lateral axis, would be accomplished by swinging the legs and body, fore and aft; lateral roll on the longitudinal axis, would be accomplished by swinging the legs and body toward one side or another; and directional yaw about the vertical axis would be accomplished by combinations of pitch and roll through angular manipulation of the legs and body into the suitable quadrant, in azimuth, to induce directional rotation or yaw. These bodily movements result in changing the center of gravity location and consequently the resultant flight path.

Uses and advantages of the combination of parachute and inflated aircraft are as follows:

*1. For emergency escape from airplane*

(a) Affords control and mobility of escapee, with possibility of return to own friendly base.

(b) Reduction of expensive retrieving rescue of downed airmen, who are not wounded.

(c) Permits better selection of landing sites, either on enemy or friendly territory for the escapee.

(d) Enables use of smaller parachute initially which may be discarded as expendable once the inflated plane is ready.

(e) Being smaller than the service type parachutes either the stabilizing parachute or the aircraft including a main inflatable body, having front and rear portions, upon which said person sits, a pair of inflatable wings, near said front portion, integral with and extending in opposite directions away from said body, a tail assembly, near said rear portion integral with said body, and a landing skid, integral with said body and extending downward in a plane perpendicular to said wings, affords lower target vulnerability during gliding descent.

*2. Emergency landings of downed airmen*

(a) Provides a more characteristic and readily spotted target if rescue operations become necessary.

(b) By deflation of aircraft upon landing, a less readily spotted target, with better concealment possibilities from enemy searchers, if needed.

3. Airborne troops (a) Increases scope of horizontal range, thus broadening area of terrain coverage with same or smaller number of men.

(b) Permits wider or better selection of possibilities for landings of desired sites.

(c) By dispersion of many inflatable aircraft offers lower target vulnerability during descent.

4. Over water aircraft emergency landings (a) Provides potentially buoyant life raft in place of possible parachute entanglement.

(b) More readily spotted visibility, if rescue operations become necessary.

Obviously many modifications and variations of the present invention are possible in the light of the above teachings. It is therefore to be understood, that within the scope of the appended claims, the invention may be practiced other ways than as specifically described.

We claim:

1. In a device for air to earth descent, the combination of a parachute, said parachute being removably secured to a set of harness straps, said harness straps being removably secured to the body of a person and also secured to a seat upon which the person sits, an inflatable aircraft including a main inflatable body, having front and rear portions, upon which said person sits, a pair of inflatable wings, near said front portion, integral with and extending in opposite directions away from said body, a tail assembly, near said rear portion integral with said body, and a landing skid, integral with said body and extending downward in a plane perpendicular to said wings, and an inflation means, said combination being so constructed and arranged that upon activation of said inflation means said inflatable aircraft will become inflated and said person may achieve controlled descent.

2. A device of the type described in claim 1, wherein said inflation means comprises a cylinder containing gas under pressure.

3. A device of the type described in claim 2, wherein said gas is nonflammable.

4. A device of the type described in claim 1, wherein said inflatable aircraft comprises a body, wings attached to said body and a tail assembly.

References Cited

UNITED STATES PATENTS 3,141,640   7/1964   Sutliff _____ 244—138

OTHER REFERENCES

Popular Mechanics, November 1961, p. 89 (Digest).

NASA Technical Note D-1932, August 1963, pp. 1, 2. (Digest).

Aviation Week and Space Technology, Dec. 16, 1963, pp. 60, 61, 63, 65 (Digest).

MILTON BUCHLER, *Primary Examiner.*

ALFRED E. CORRIGAN, *Examiner.*

R. A. DORNON, *Assistant Examiner.*